US012168309B2

(12) United States Patent
Garay et al.

(10) Patent No.: US 12,168,309 B2
(45) Date of Patent: Dec. 17, 2024

(54) METHODS FOR CASTING A COMPONENT VIA A UNITARY CORE-SHELL MOLD

(71) Applicant: General Electric Company, Schenectady, NY (US)

(72) Inventors: Gregory Terrence Garay, West Chester, OH (US); Brian David Przeslawski, Liberty Township, OH (US); Xi Yang, Mason, OH (US); Joseph Edward Hampshire, West Chester, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/317,151

(22) Filed: May 11, 2021

(65) Prior Publication Data

US 2022/0362965 A1 Nov. 17, 2022

(51) Int. Cl.
*B22C 9/10* (2006.01)
*B22C 9/06* (2006.01)
*B22C 9/24* (2006.01)
*B28B 1/00* (2006.01)
*B28B 11/24* (2006.01)
*B28B 17/00* (2006.01)
(Continued)

(52) U.S. Cl.
CPC .............. *B28B 1/001* (2013.01); *B22C 9/06* (2013.01); *B28B 11/243* (2013.01); *B28B 17/0081* (2013.01); *B33Y 10/00* (2014.12); *B33Y 40/20* (2020.01); *B33Y 50/02* (2014.12); *B33Y 80/00* (2014.12)

(58) Field of Classification Search
CPC .............. B22C 9/06; B22C 9/10; B22C 9/24

USPC ................. 164/4.1, 6, 23, 24, 361, 365, 369
See application file for complete search history.

(56) References Cited

U.S. PATENT DOCUMENTS

| 5,256,340 A | 10/1993 | Allison et al. |
| 5,387,380 A | 2/1995 | Cima et al. |
| (Continued) | | |

FOREIGN PATENT DOCUMENTS

| CN | 105163922 A | 12/2015 |
| CN | 111992666 A | 11/2020 |
| (Continued) | | |

OTHER PUBLICATIONS

Bae, Integrally Cored Ceramic Investment Casting Mold Fabricated by Ceramic Stereolithography, XP055437811, Jan. 1, 2008, 288 Pages.

*Primary Examiner* — Kevin P Kerns
(74) *Attorney, Agent, or Firm* — Dority & Manning, P.A.

(57) ABSTRACT

A method is provided for casting a component. Accordingly, data indicative of at least one location of a unitary core-shell mold which is susceptible to a stress concentration is received. An additive manufacturing process is employed to form the unitary core-shell mold defining a casting cavity. The unitary core-shell mold includes a shell wall defining an outer component shape and a core wall positioned inward of the shell wall. The core wall defines an inner component shape. The core wall and/or the shell wall defines at least one reinforcement recess adjacent to the at least one location which is susceptible to the stress concentration. Following the forming of the unitary core-shell mold, at least one support member is positioned within the reinforcement recess in contact with the at least one location. With the support member in place, the component is cast within the casting cavity.

14 Claims, 9 Drawing Sheets

(51) Int. Cl.
*B33Y 10/00* (2015.01)
*B33Y 40/20* (2020.01)
*B33Y 50/02* (2015.01)
*B33Y 80/00* (2015.01)

(56) References Cited

U.S. PATENT DOCUMENTS

| | | |
|---|---|---|
| 6,117,612 A | 9/2000 | Holleran et al. |
| 7,216,694 B2 | 5/2007 | Otero et al. |
| 7,413,001 B2 | 8/2008 | Wang et al. |
| 7,441,585 B2 | 10/2008 | Otero et al. |
| 7,448,433 B2 | 11/2008 | Ortiz et al. |
| 8,851,151 B2 | 10/2014 | Frasier et al. |
| 8,893,767 B2 | 11/2014 | Mueller et al. |
| 9,555,470 B1 | 1/2017 | Heneveld et al. |
| 2010/0003619 A1 | 1/2010 | Das et al. |
| 2013/0177448 A1 | 7/2013 | Spangler |
| 2014/0103581 A1 | 4/2014 | Das et al. |
| 2016/0001354 A1 | 1/2016 | Pinero et al. |
| 2016/0167115 A1 | 6/2016 | Merrill et al. |
| 2016/0221262 A1 | 8/2016 | Das et al. |
| 2019/0111472 A1 | 4/2019 | Hampshire et al. |

FOREIGN PATENT DOCUMENTS

| | | |
|---|---|---|
| EP | 1616642 A1 | 1/2006 |
| GB | 2346340 A | 8/2000 |
| JP | 2003/520134 A | 7/2003 |
| JP | 2017/109245 A | 6/2017 |

METHODS FOR CASTING A COMPONENT VIA A UNITARY CORE-SHELL MOLD

FIELD

The present subject matter relates generally to the production of components for gas turbine engines, and more particularly, to methods of casting using an additively manufactured mold.

BACKGROUND

Gas turbine engine components, such as turbine airfoils, are frequently manufactured using an investment casting process in which molten metal alloy is introduced into a mold cavity defined between a shell and a core and allowed to solidify, forming a completed casting. Depending on the application, the components, such as turbine blades and/or stator vanes, may be required to withstand thermal stresses due to high temperatures and large temperature fluctuations, as well as forces due to high rotational speeds experienced during normal operations of the gas turbine engine. Accordingly, the components may include complex internal cooling passages.

Conventional techniques for manufacturing engine parts and components may, for example, involve investment or lost-wax casting. Using such techniques, a mold and a core may be separately manufactured using known techniques. However, such techniques may be time-consuming and/or may limit the resolution of the mold and/or core. The limited resolution may result in a decreased ability to develop fine-detail cast features in the end product of the casting process.

Thus, the art is continuously seeking new and improved systems and methods that address the aforementioned issues. As such, the present disclosure is directed to methods for casting a component utilizing an additively manufactured mold.

BRIEF DESCRIPTION

Aspects and advantages of the invention will be set forth in part in the following description, or may be obvious from the description, or may be learned through practice of the invention.

In one aspect, the present disclosure is directed to a method for casting a component. The method may include receiving data indicative of at least one location of a unitary core-shell mold which is susceptible to a stress concentration when the unitary core-shell mold is employed to cast the component. The method may also include forming, via an additive manufacturing process, the unitary core-shell mold defining a casting cavity. The unitary core-shell mold may include a shell wall defining an outer component shape and a core wall defining an inner component shape. The shell wall and/or the core wall may define at least one reinforcement recess adjacent to the location(s) which is susceptible to the stress concentration. Following the forming of the unitary core-shell mold, at least one support member may be positioned within the reinforcement recess(es) and in contact with the location(s). Additionally, the method may include casting the cast component within the casting cavity.

In an additional aspect, the present disclosure is directed to a method for fabricating a unitary core-shell mold. The method may include receiving data indicative of the location(s) of the unitary core-shell mold which is susceptible to a stress concentration when the unitary core-shell mold is employed to cast a component. The method may also include forming the unitary core-shell mold to define a casting cavity. The unitary core-shell mold may include a shell wall defining an outer component shape and a core wall positioned inward of the shell wall. The core wall may define an inner component shape. The shell wall and/or the core wall may define the reinforcement recess(es) adjacent to the location(s) which is susceptible to the stress concentration. The forming of the unitary core-shell mold may include contacting a cured portion of the unitary core-shell mold with a liquid ceramic photopolymer. The forming may also include irradiating a portion of the liquid ceramic photopolymer adjacent to the cured portion through a window contacting the liquid ceramic photopolymer. Additionally, the unitary core-shell mold may be removed from the uncured liquid ceramic photopolymer. Following the forming of the unitary core-shell mold, the support member(s) may be positioned within the reinforcement recess(es) and in contact with the location(s).

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
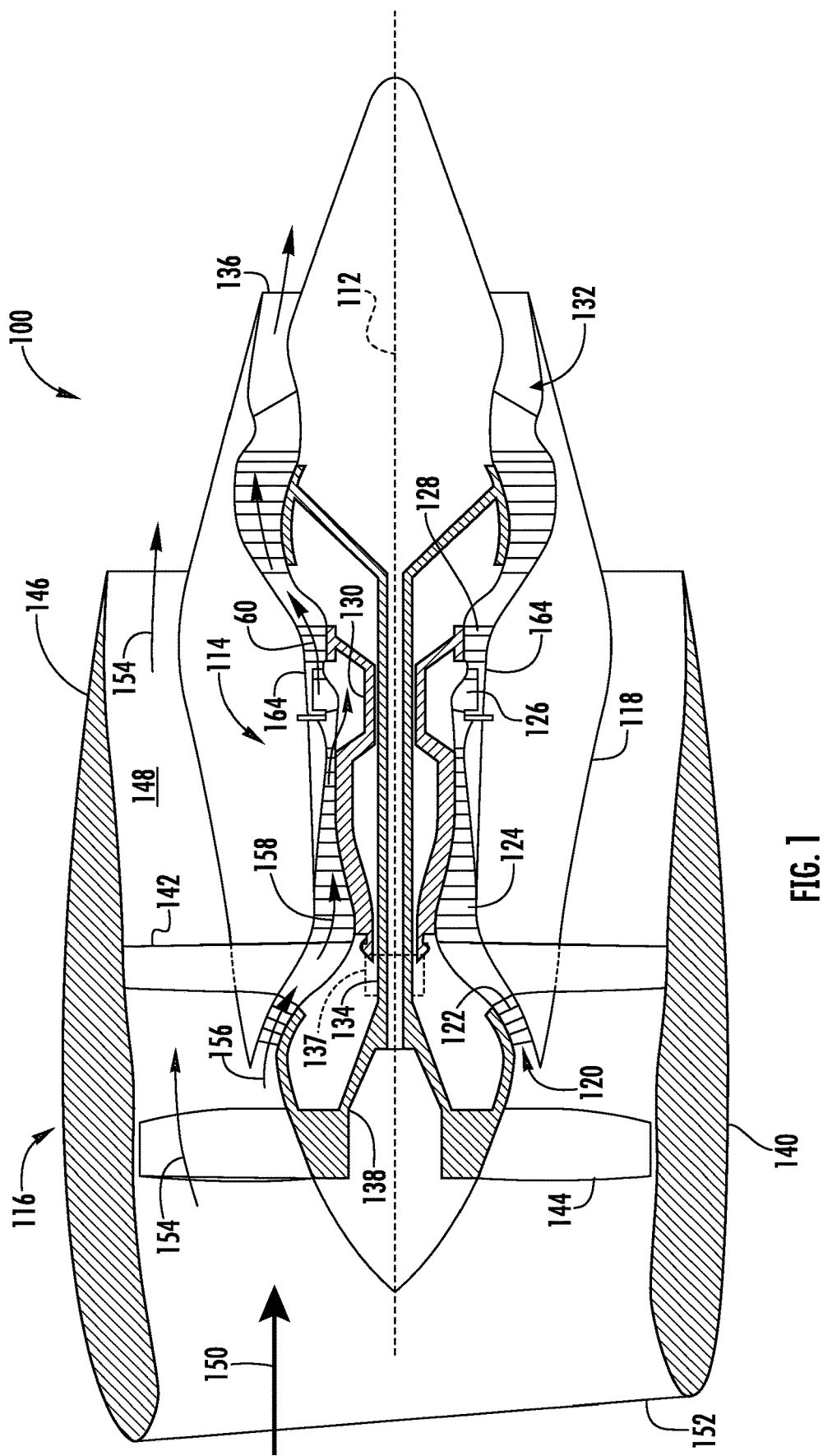
FIG. 1 illustrates a schematic cross-sectional view of one embodiment of a gas turbine engine for use in accordance with the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

In general, the present subject matter is directed to a method for forming a cast component. In particular, the present subject matter is directed to the leveraging of multiple benefits that may be obtained via the utilization of an additively manufactured unitary core-shell mold. For example, the utilization of additive manufacturing techniques may facilitate the casting of fine details and/or structures that may not be obtainable via conventional casting methods. For example, additively manufacturing a core mold for a component (e.g., turbine blade) of a gas turbine engine may facilitate the forming of more intricate cooling passages than may be obtainable using conventional casting methods.

Although the utilization of additive manufacturing as described may be beneficial with regard to the structure of the cast component, the material cost and/or printing time associated with the process may be inconsistent with other production priorities. Accordingly, it may be desirable to minimize printing time and/or the amount of material required to form the mold. An approach to minimizing both the printing time and/or the material requirements of the mold formation, may include printing a unitary core-shell mold and/or minimizing the thicknesses of the walls of the mold. As such, rather than printing walls having a unitary thickness capable of resisting the maximal possible load (e.g., a stress concentration) experienced by the mold during the casting process, the walls may be formed with a thickness having a load limit that is less than a maximal load. For example, the walls may be formed with a load limit capable of resisting the average load projected to be experienced by the walls during the casting process, rather than the load of the stress concentration. Thus, it may be desirable to support the portions of the unitary core-shell mold that may be susceptible to stress concentrations rather than increasing the overall wall thicknesses of the unitary core-shell mold.

In order to realize the benefits of casting via an additively manufactured mold while also satisfying other production priorities, the component may be cast utilizing the methods disclosed herein. For example, the methods may include receiving data indicative of at least one location of an unitary core-shell mold that may be susceptible to a stress concentration whenever the mold is employed to cast the component. Based on this data, the unitary core-shell mold may be formed via an additive manufacturing process. The unitary core-shell mold may define a casting cavity that may define both an outer component shape and an inner component shape. Specifically, the unitary core-shell mold may include a shell wall that may define the outer component shape. The unitary core-shell mold may also include a core wall that may be positioned inward of the shell wall and may define the inner component shape. Additionally, the shell wall and/or the core wall may define at least one reinforcement recess adjacent to the indicated location that is susceptible to the stress concentration. Once the unitary core-shell mold is formed, at least one support member may be positioned within the reinforcement recess(es) and in contact with the indicated location. It should be appreciated that the support member(s) may facilitate the resisting of the stress concentration and thereby preclude a failure of the unitary core-shell mold during a casting process. Once the support member(s) is positioned within the unitary core-shell mold, the component material (e.g., molten metal) may be introduced (e.g., poured) into the unitary core-shell mold to cast the cast component within the casting cavity.

Referring now to the drawings, FIG. 1 illustrates a cross-sectional view of one embodiment of a gas turbine engine 100 that may be utilized with an aircraft in accordance with aspects of the present subject matter. Various components of the gas turbine engine 100 may be formed via the methods for casting a component disclosed herein. The engine 100 is shown having a longitudinal or axial centerline axis 112 extending therethrough for reference purposes. The engine 100 will be discussed in detail below. Although shown as a turbofan jet engine, the methods described herein may be used on any turbomachine including, but not limited to, high-bypass turbofan engines, low-bypass turbofan engines, turbojet engines, turboprop engines, turboshaft engines, propfan engines, and so forth. The turbomachine may be configured in any suitable manner, such as for vehicle propulsion or ground-based power production.

Various embodiments of a method 400, and aspects thereof, for forming a cast component are depicted in FIGS. 2-8. The cast component may, for example, be a component of the gas turbine engine 100, such as turbine blades and/or stator vanes. Additionally, in an embodiment, the cast component may be formed with a plurality of internal passageways (e.g., cooling passages) that may intersect with an outer surface of the cast component.

Figure 2:
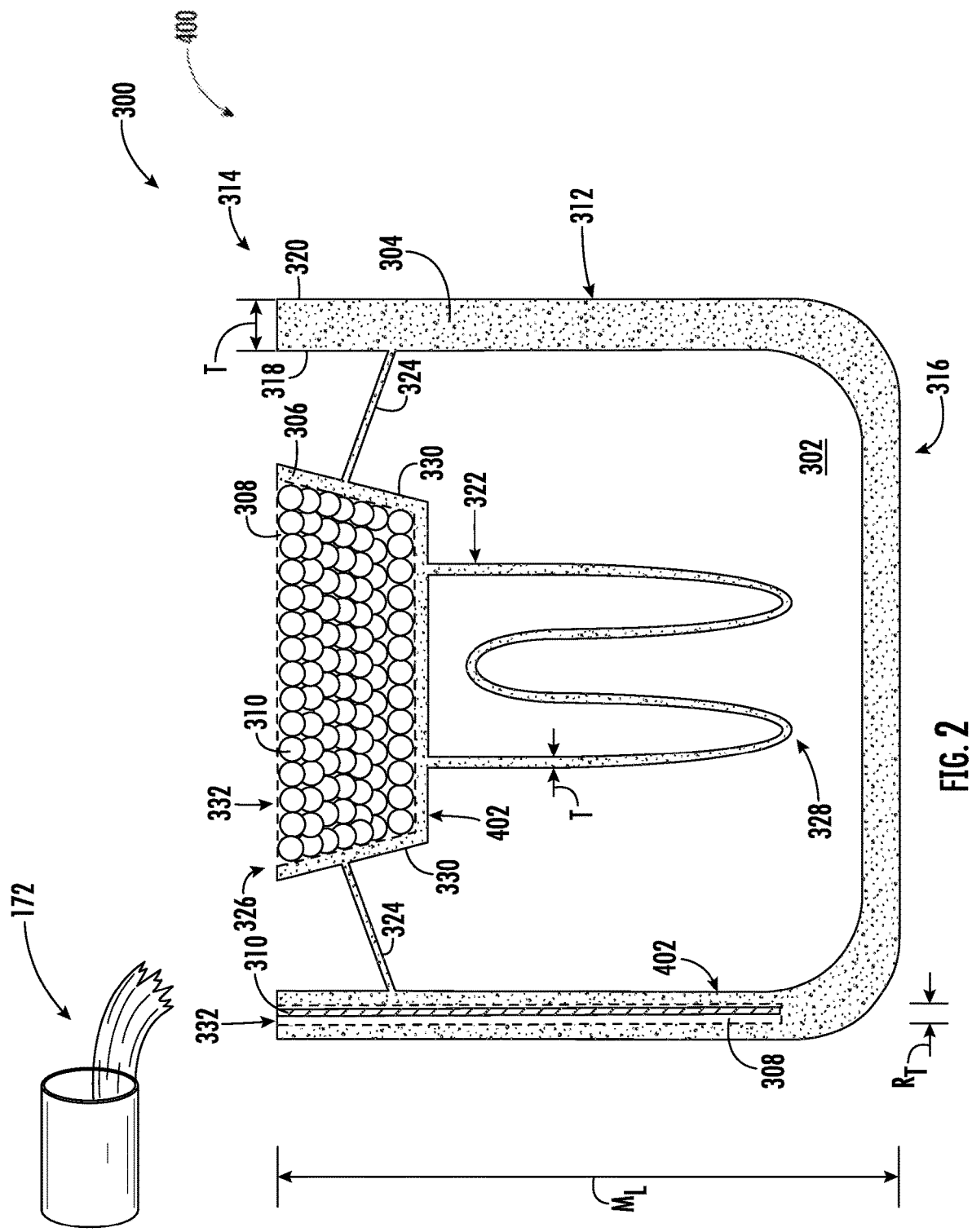
FIG. 2 illustrates a cross-sectional side view of a unitary core-shell mold according to the present disclosure.

In an embodiment, and as particularly shown in FIG. 2, the cast component may be formed, at least in part, via a casting process wherein a component material 172 in liquid form is introduced into a unitary core shell mold 300. For example, in an embodiment, a molten superalloy metal may be poured into the unitary core shell mold 300. The molten superalloy may include stainless steel, aluminum, titanium, Inconel® 625 (Special Metals Corporation, NY), Inconel® 718 (Special Metals Corporation, NY), Inconel® 188 (Special Metals Corporation, NY), a cobalt chromium, nickel and/or any alloy thereof, such as nickel superalloys, and/or nickel superalloy single crystal alloys.

The method 400 may, in an embodiment, include receiving data indicative of at least one location 402 of the unitary core-shell mold 300 that is susceptible to a corresponding stress concentration 404 (FIG. 4) when the unitary core-shell mold 300 is employed to cast the component. As depicted at 406 (FIG. 8), the method 400 may form, via an additive manufacturing process, the unitary core-shell mold 300 defining a casting cavity 302. With continued reference particularly to FIG. 2, the unitary core-shell mold 300 may include a shell wall 304 that defines an outer component shape. The unitary core-shell mold 300 may also include a core wall 306 that may be positioned inward of a shell wall 304. The core wall 306 may define an inner component shape. The shell wall 304 and/or the core wall 306 may define at least one reinforcement recess 308 adjacent to the location(s) 402 that is susceptible to the stress concentration 404. Once the unitary core-shell mold 300 is formed at step 406, the method 400 may include, as depicted at 408, positioning at least one support member 310 within the reinforcement recess(es) 308 and in contact with the at least one location(s) 402. Additionally, as depicted at 410, the method 400 may include casting the cast component within the casting cavity 302.

The unitary core-shell mold 300 may be constructed from a refractory material capable of maintaining structural integrity when exposed to molten metal alloys at high temperatures. For example, the unitary core-shell mold 300 may be formed from a solid ceramic material. Nonlimiting examples of ceramics include those based on silica, alumina, calcium, magnesium, zirconia, and other refractory oxides. Materials such as alumina- and zirconia-based ceramics are considered nonreactive with certain metal alloys.

It should be appreciated that the method 400 may facilitate the utilization of high temperature, engineered support mechanisms (e.g., the support member(s) 310 positioned within the reinforcement recess(es) 308) during a pouring phase of a casting process wherein a molten metal may be poured into the unitary core-shell mold 300. As such, the amount of additive material required to produce the unitary core-shell mold 300 may be reduced relative to a conventionally-produced casting core and/or shell mold. Additionally, the printing time required to produce the unitary core-shell mold 300 via additive manufacturing may be reduced.

Figure 4:
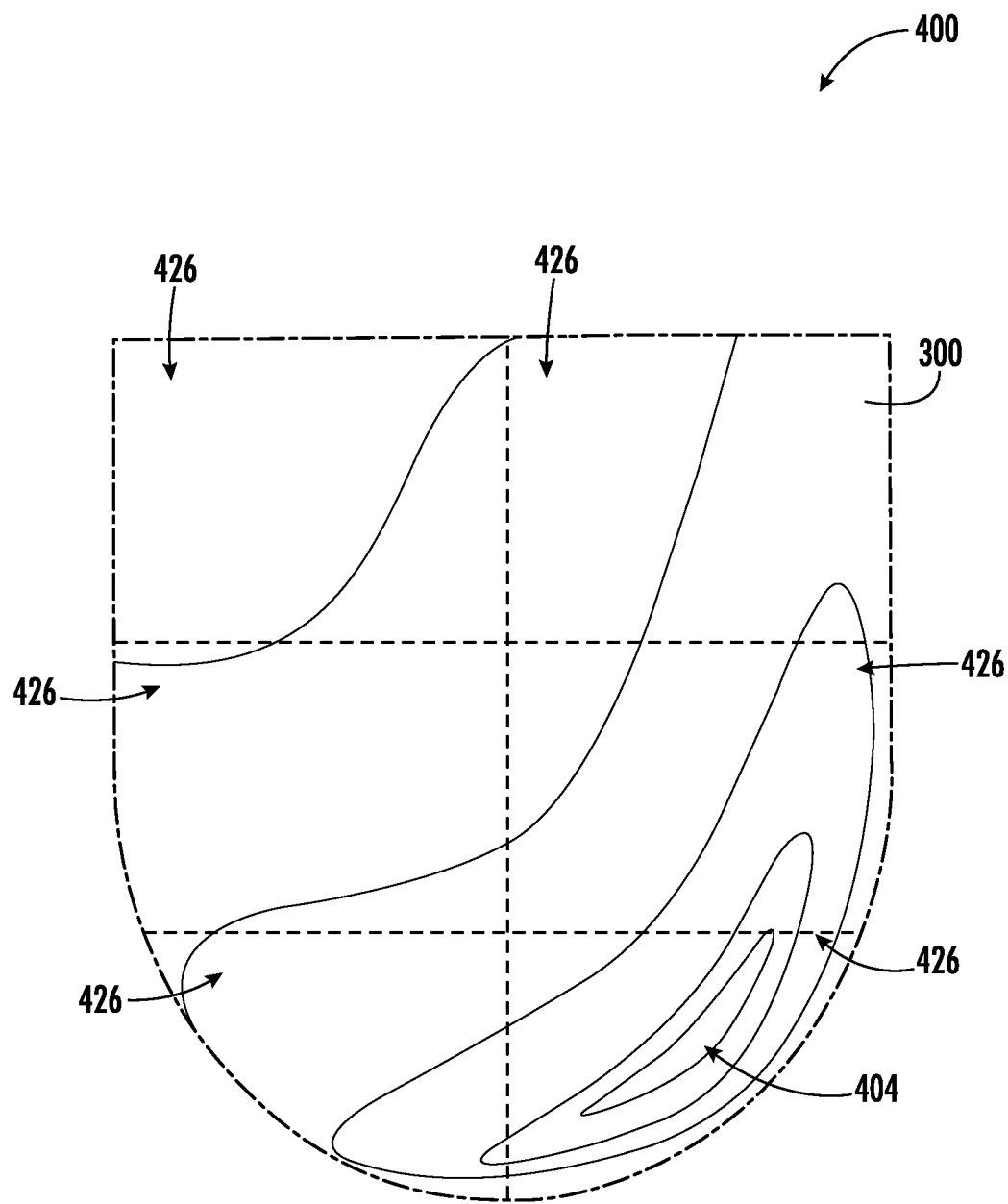
FIG. 4 illustrates a side view of a projected unitary core-shell mold illustrating a stress concentration according to the present disclosure.
Figure 5:
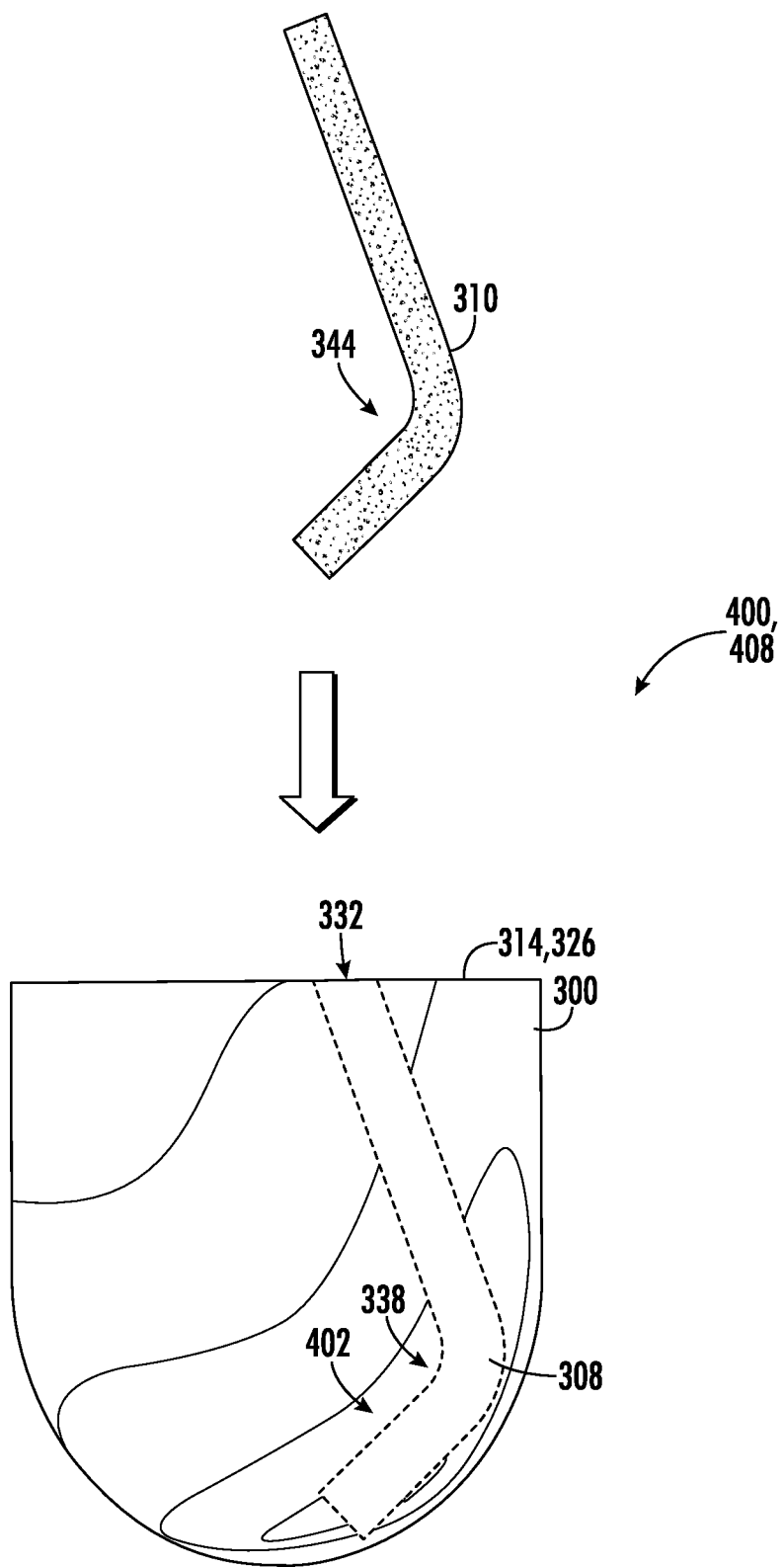
FIG. 5 illustrates a side view of the unitary core-shell mold of FIG. 2, particularly illustrating a reinforcement recess and support member according to the present disclosure.
Figure 6:
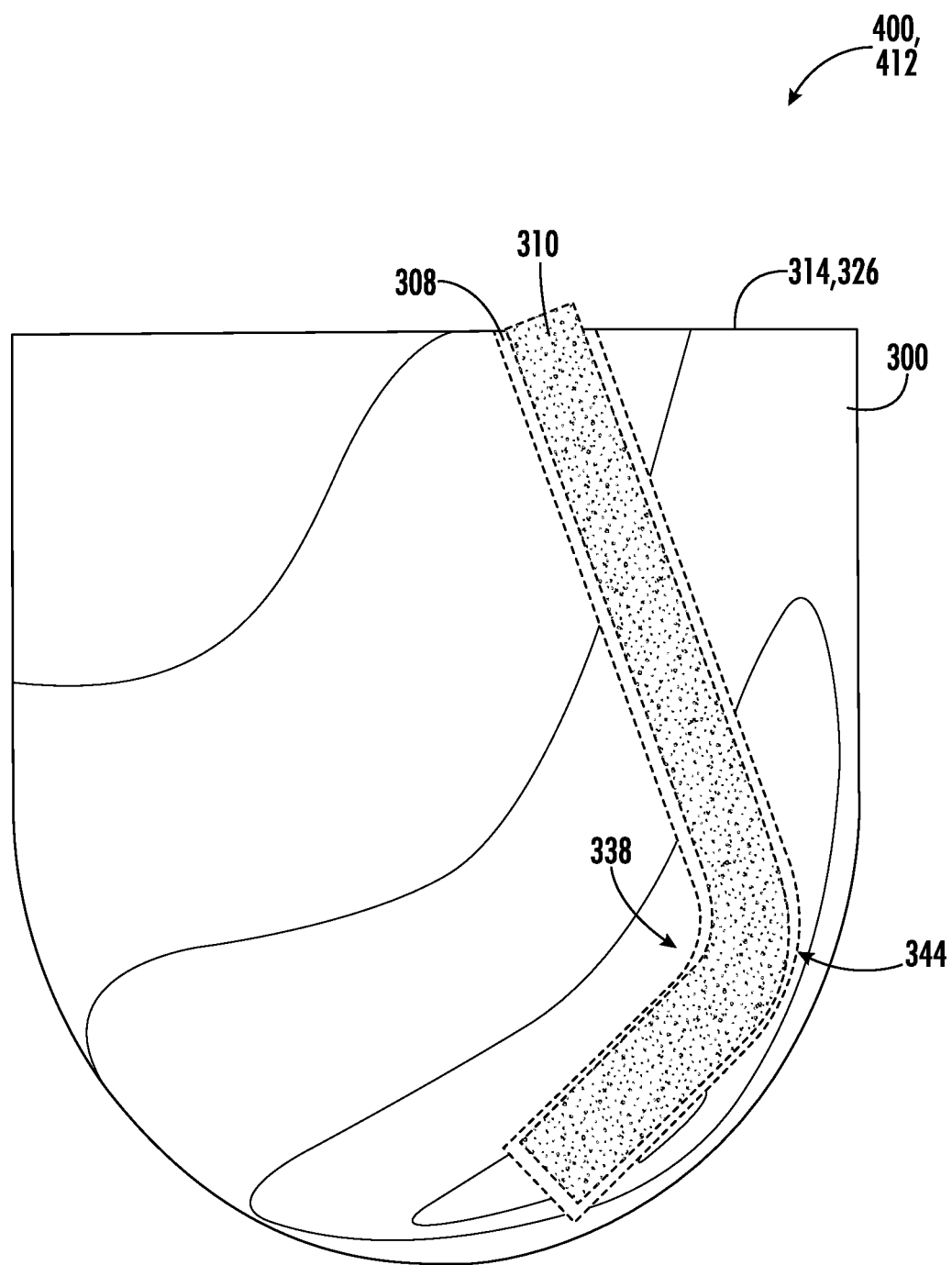
FIG. 6 illustrates a side view of the unitary core-shell mold of FIG. 2 particularly illustrating the support member positioned within the reinforcement recess according to the present disclosure.

By way of illustration, an embodiment of the method 400 is graphically depicted by FIGS. 4-6 in sequence. FIG. 4 illustrates the receiving of data indicative of the location(s) 402 of the unitary core-shell mold 300 (depicted as a potential (e.g., a design) unitary core-shell mold 300) that is susceptible to the stress concentration 404 (e.g., the projected stress concentration(s) 404 anticipated when the unitary core-shell mold 300 is employed to cast the component). FIG. 5 illustrates the unitary core-shell mold 300 formed via an additive manufacturing process. The unitary core-shell mold 300 may define the reinforcement recess(es) 308 adjacent to the location(s) 402. FIG. 5 also illustrates that the support member(s) 310 is positioned within (e.g., inserted into) the reinforcement recess(es) 308 following the formation of the unitary core-shell mold 300. FIG. 6 depicts the unitary core-shell mold 300 with the support member(s) 310 positioned within the reinforcement recess(es) 308 prior to and/or during the casting of the cast component.

Figure 3:
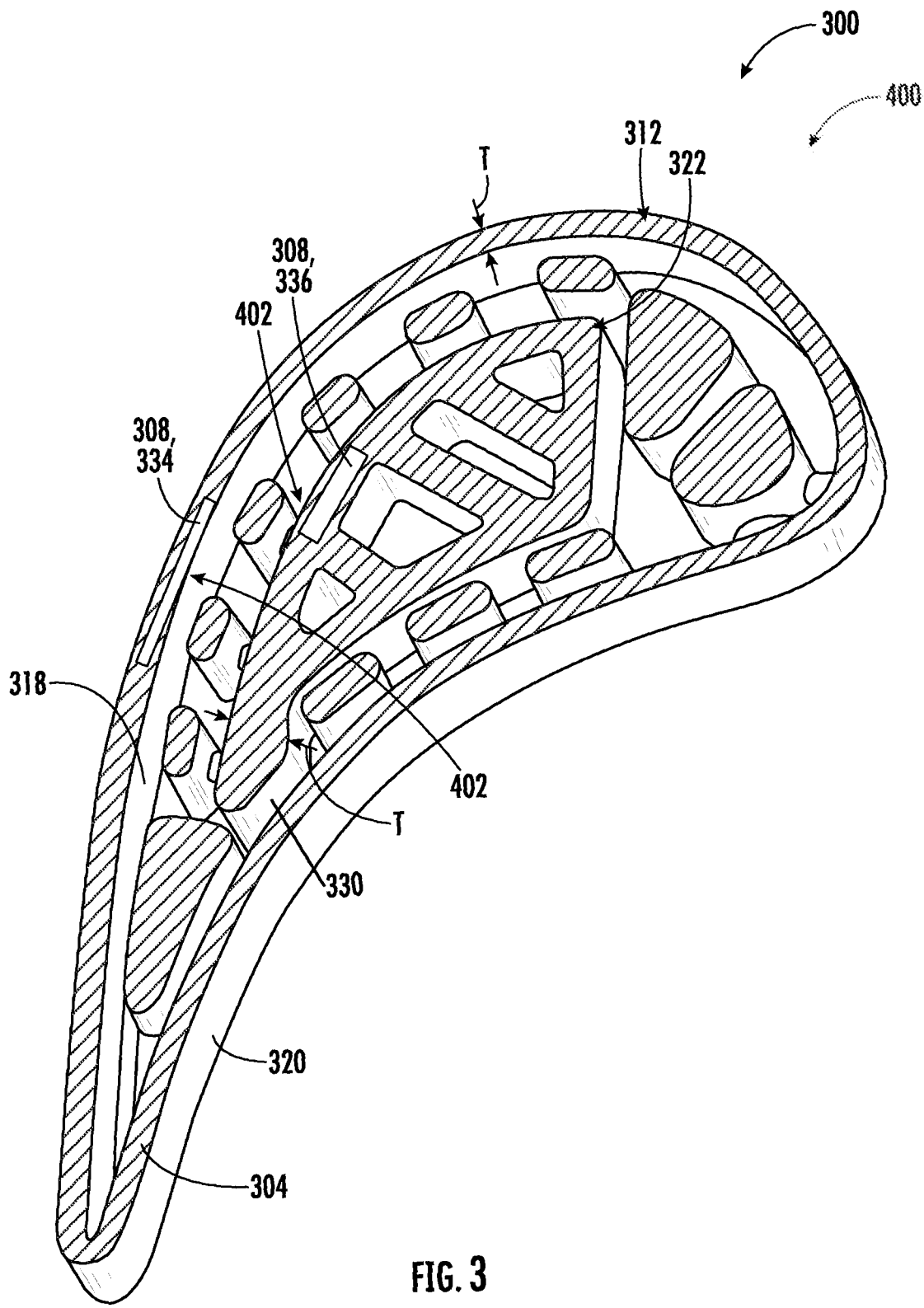
FIG. 3 illustrates a perspective cross-sectional view of a unitary core-shell mold according to the present disclosure.

As particularly depicted in FIGS. 2 and 3, in an embodiment, the unitary core-shell mold 300 may include a shell portion 312. The shell portion 312 may include the shell wall 304. The shell wall 304 may, in an embodiment, extend between a first mold end 314 and a second mold end 316 to define a mold length ($M_L$). The shell wall 304 may have a wall thickness (T) defined by an inner wall face 318 and an outer wall face 320. The inner wall face 318 of the shell wall 304 may, in an embodiment, define an outer component shape of the cast component.

In an embodiment, the shell wall 304 may be configured as an outermost wall of the unitary core-shell mold 300. As such, the outer wall face 320 may be exposed when the unitary core-shell mold 300 is employed to cast the cast component and the unitary core-shell mold 300 may have an absence of an overshell. In other words, the shell wall 304 may have sufficient strength when formed in accordance with the method 400 to resist loads developed upon the introduction of the component material 172 without necessitating support from an overshell.

The shell wall 304 may, in an embodiment, have a wall thickness (T) of 0.1 mm to 5 mm. The wall thickness (T) may be developed via the addition of wall layers until a plurality of wall layers establish the desired thickness. However, in an additional embodiment, the shell wall 304 may include a single wall layer of the desired thickness. By way of further example, the wall thickness (T) may be 0.1 mm to 4 mm, 0.5 mm to 4 mm, 0.5 mm to 2.5 mm, 0.1 mm to 2.5 mm, 1 mm to 3 mm, or 2 mm to 4 mm. It should be appreciated that, in at least one embodiment, the wall thickness (T) may be a removal facilitation feature. As such, the wall thickness (T) may be selected to ensure the shell wall 304 is of sufficient strength to resist at least one load developed by the introduction of the component material 172 into the casting cavity 302 as the cast component is cast, while maximizing the removability of the unitary core-shell mold 300.

In an embodiment, the unitary core-shell mold 300 may include a core portion 322 that may be positioned inward of the shell wall 304 and be unitary therewith. For example, the core portion 322 may be circumscribed by the shell wall 304. In an embodiment, the core portion 322 may be integrated with the shell portion 312 via a plurality of tie structures 324 (which may also be referred to as "filaments") extending between the core and shell portions 322, 312. It should be appreciated that the tie structures 324 may be oriented to coincide with at least one feature of the cast component, such as a cooling hole of a turbine blade. It should further be appreciated that as a unitary structure, the plurality of tie structures 324 may be formed contemporaneously with the core and shell portions 322, 312 via the additive manufacturing process.

In an embodiment, the core portion 322 may include the core wall 306. The core wall 306 may extend between a first core end 326 and a second core end 328. The first core end 326 may, for example, be generally coplanar with the first mold end 314, while the second core end 328 may be disposed completely within the casting cavity 302. A core face 330 of the core wall 306 may, in an embodiment, define an inner component shape of the cast component. Accordingly, the wall thickness (T), in the context of the core wall 306, may be defined between opposing core faces 330 of the core wall 306, such as depicted in FIG. 3. As further depicted in FIG. 3, in an additional embodiment, the wall thickness (T) of the core wall 306 may be defined between a core face 330 and an opposing recess/cavity of the core wall 306.

As particularly illustrated in FIGS. 2, 3, 5, and 6, the shell wall 304 and/or the core wall 306 may be formed to define the reinforcement recess(es) 308 adjacent to the location(s) 402 that is susceptible to a stress concentration(s) 404. The reinforcement recess(es) 308 may be configured to receive the support member(s) 310 thereby locating the support member(s) 310 in position to facilitate the resisting of the stress concentration developed by the component material 172 by the shell and/or core wall 304, 306.

In an embodiment, the reinforcement recess(es) 308 may be located entirely within the corresponding wall of the unitary core-shell mold 300. In other words, the reinforcement recess(es) 308 may be positioned entirely within the wall thickness (T) of the shell and/or core wall 304, 306. For example, in an embodiment, the reinforcement recess(es) 308 may be positioned between the inner and outer wall faces 318, 320 of the core wall 304 and may not breach either of the inner and outer wall faces 318, 320. As such, the reinforcement recess(es) 308 may have a recess thickness (RT) that is less than the wall thickness (T).

In an embodiment, the reinforcement recess(es) 308 may define a recess opening 332 in the shell wall 304 at the first mold end 314. In an additional embodiment, the reinforcement recess(es) 308 may define a recess opening 332 in the core wall 306 at the first core end 326. As such, the recess opening 332 may facilitate the positioning of the support member(s) 310 within the reinforcement recess(es) 308 following the formation of the unitary core-shell mold 300. It should be appreciated that reinforcement recess(es) 308 may extend from the first ends 314, 326 towards the corresponding second ends 316, 328.

As particularly depicted in FIGS. 2 and 3, in an embodiment, the unitary core shell mold 300 may include a plurality of reinforcement recesses 308. For example, in the embodiment of FIG. 3, a first reinforcement recess 334' may be defined by the shell wall 304 while a second reinforcement recess 336' may be defined by the core wall 306. It should be appreciated that in various embodiments, a plurality of reinforcement recesses 308 may be defined in the shell wall 304, the core wall 306, or both.

Referring now to FIGS. 2, 5, 6, and 7, in an embodiment, the support member(s) 310 may be formed from a refractory material having a melting temperature that is higher than the melting temperature of the component material 172. For example, the support member(s) 310 may be formed from alumina or a derivation thereof. Additionally, the support member(s) 310 may be formed to have a selective stiffness and/or thermal characteristic.

In an embodiment, the support member(s) 310 may have a length, extending generally between the first mold end 314 and the second mold end 316, that is greater than a width. For example, the support member(s) 310 may be configured as a sheet, panel, rod, ribbon, flat stock, or similar structure having the degree of stiffness and/or thermal characteristic required to support the shell and/or core wall 304, 306. In an exemplary embodiment, the support member(s) 310 may be formed as a metal sheet having a high melting temperature such that the melting temperature is higher than the component material 172. It should be appreciated that inserting the metal sheet (or similar structure) into the reinforcement recess(es) 308 within the defining shell and/or core wall 304, 306 may increase a load limit of the location(s) 402. Further, the utilization of the support member(s) 310, in the form of a metal sheet, may facilitate the formation of the location(s) 402 with a reduced thickness relative to other portions 426 of the unitary core-shell mold 300.

As depicted in FIG. 2, the support member(s) 310 may, in an embodiment, be configured as a plurality of spheres. In such an embodiment, the plurality of spheres may be inserted into the reinforcement recess(es) 308 following the formation of the unitary core-shell mold 300. It should be appreciated that inserting the spheres in the reinforcement recess(es) 308 may facilitate the formation of certain portions 426 (e.g., the location(s) 402) of the unitary core-shell mold 300 with a reduced thickness relative to other portions 426 of the unitary core-shell mold 300. The reduced thickness may improve the thermal characteristics of the unitary core-shell mold 300. For example, the utilization of the support member(s) 310 (e.g., as a plurality of spheres) may facilitate an improved cooling rate during the casting process and/or an increased thermal capacity of a portion 426 of the unitary core-shell mold 300. As such, the amount of additive material and print time required to form the unitary core-shell mold 300 may be minimized. It should further be appreciated that non-spherical, and/or irregular shaped support members may also be used in conjunction with, or in place of, the spheres.

As depicted at 412, in an embodiment, positioning the support member(s) 310 (as illustrated in FIG. 5) within the reinforcement recess(es) 308 may also include securing the support member(s) 310 within the reinforcement recess(es) 308. Accordingly, in an embodiment, the reinforcement recess(es) 308 may include a first retention feature 338.

In an embodiment, the first retention feature 338 may include a shape of the reinforcement recess(es) 308. For example, as depicted in FIGS. 5 and 6, the reinforcement recess(es) 308 may be formed with a curve that facilitates the retention of the support member(s) 310. In a further example wherein the first retention feature 338 corresponds to the shape of the reinforcement recess(es) 308, a dimension of the reinforcement recess(es) 308 may narrow in order to establish a friction fit with the support member(s) 310. In an embodiment, and with reference to FIG. 7, the first retention feature 338 may include at least one protrusion 340' positioned within the reinforcement recess(es) 308. In a further embodiment, the first retention feature 338 may include at least one recess 342'.

Figure 7:
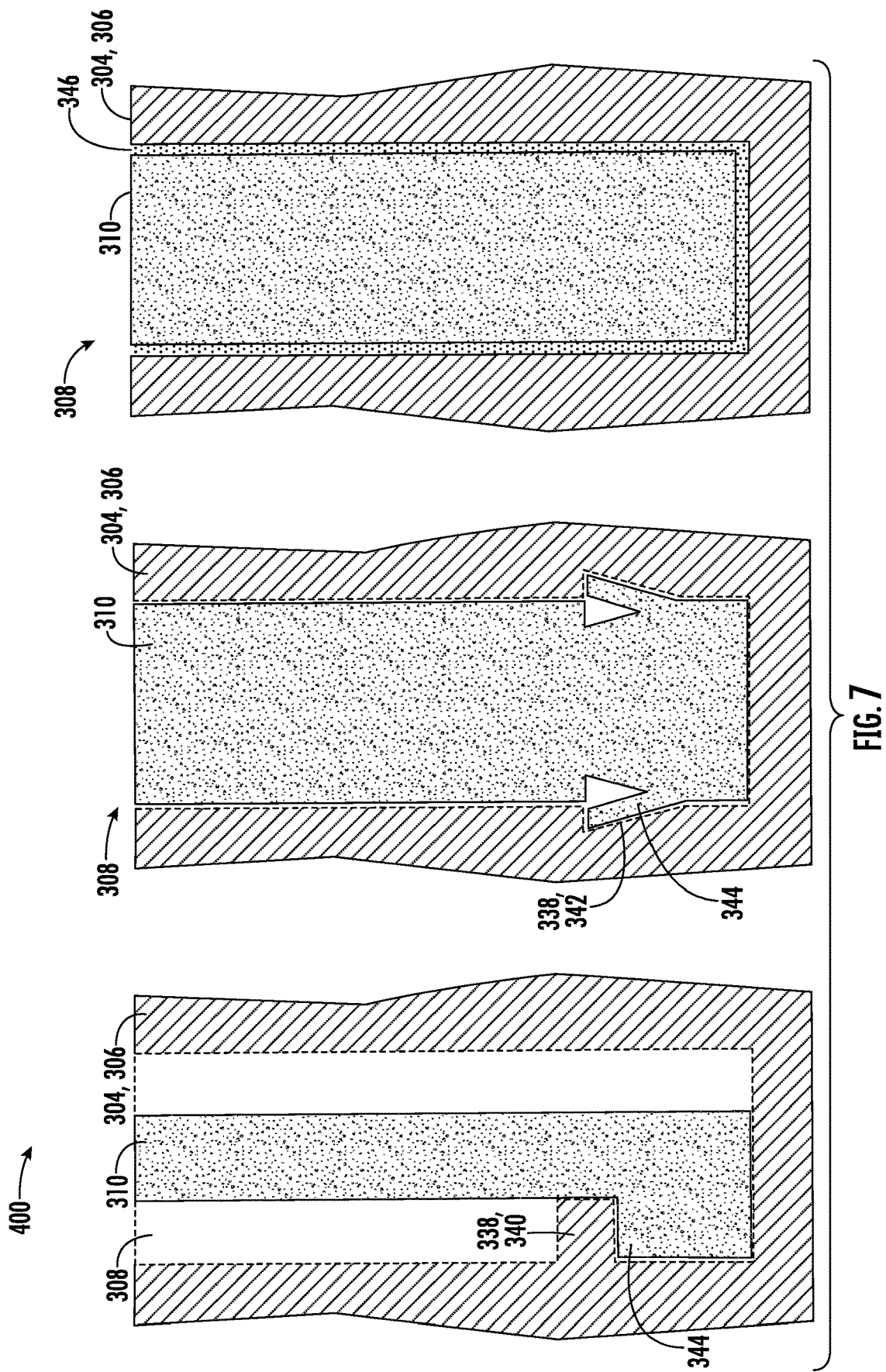
FIG. 7 illustrates various embodiments of the support member secured within the reinforcement recess of the unitary core-shell mold of FIG. 2 according to the present disclosure.
Figure 8:
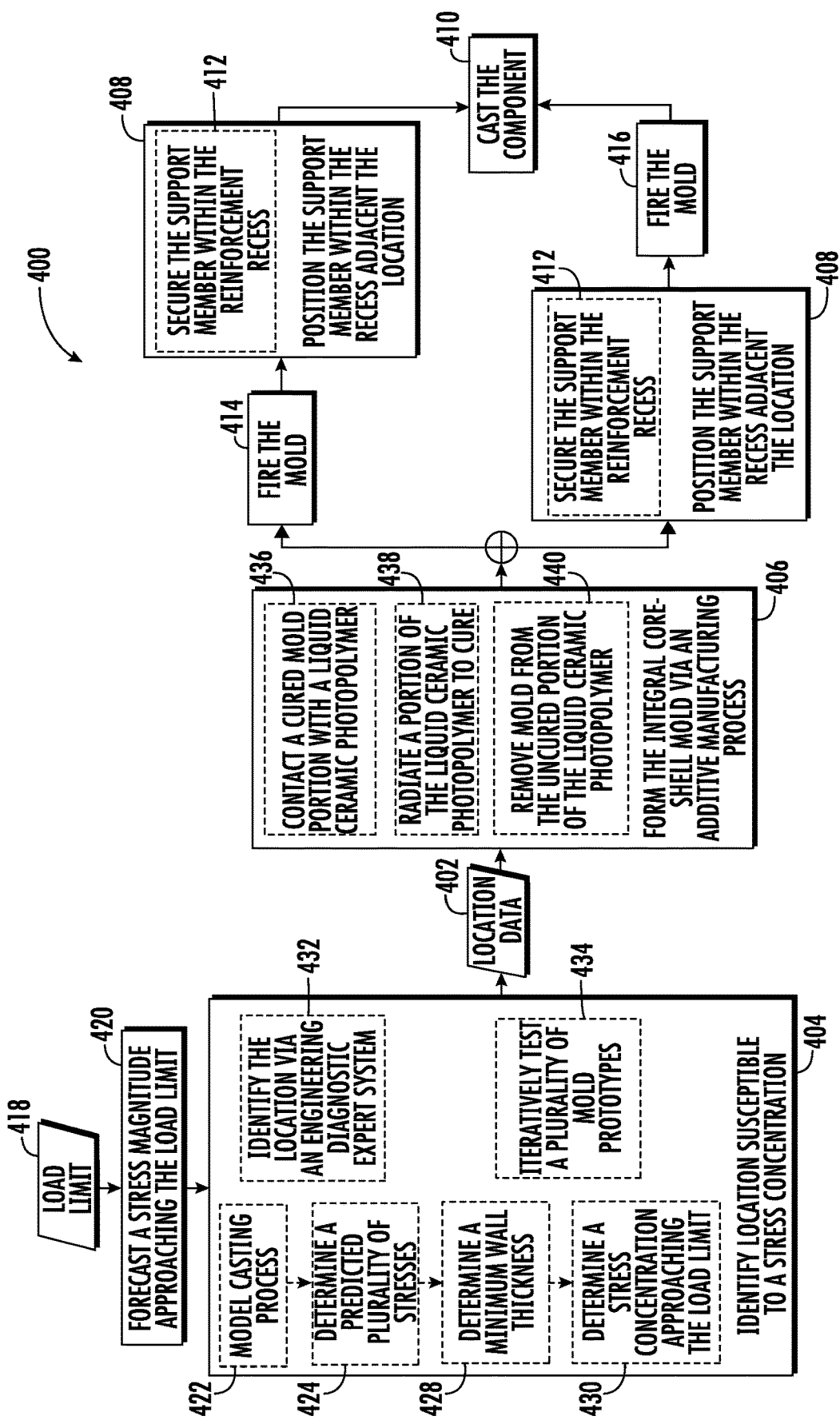
FIG. 8 illustrates a flow diagram for casting a component according to the present disclosure.

In order to secure the support member(s) 310 within the reinforcement recess(es) 308, the support member(s) 310 may be formed with a second retention feature 344 configured to engage the first retention feature 338. In an embodiment, the second retention feature 344 may include a shape of the support member(s) 310. For example, as depicted in FIGS. 5 and 6, the support member(s) 310 may be formed with a curve that corresponds to a curve of the reinforcement recess(es) 308. In a further example, a dimension of the support member(s) 310 may broaden in order to establish a friction fit with the reinforcement recess(es) 308. In an additional embodiment, as depicted in FIG. 7, the second retention feature 344 may include at least one protrusion configured to engage the corresponding protrusion(s) 340 and/or recess(es) 342 of the reinforcement recess(es) 308.

In a further embodiment, securing the support member(s) 310 within the reinforcement recess(es) 308 may be accomplished via chemical means. Accordingly, as depicted in FIG. 7, an adhering agent 346 may be introduced into the reinforcement recess(es) 308 following insertion of the support member(s) 310. For example, following the positioning of the support member(s) 310 within the reinforcement recess(es) 308, an adhesive, epoxy, concrete and/or other liquid may be permitted to cure within the reinforcement recess(es) 308 and secure the support member(s) 310 therein.

As depicted at 414, the method 400 may include firing the unitary core-shell mold 300 prior to the positioning of the support member(s) 310 within the reinforcement recess(es) 308 at step 408. It should be appreciated that firing the unitary core-shell mold 300 prior to the insertion of the support member(s) 310 may permit the forming of the support member(s) 310 from a material having a lower melting point than the firing temperature.

As depicted at 416, the method 400 may include firing the unitary core-shell mold 300 following the positioning of the support member(s) 310 within the reinforcement recess(es) 308 at step 408. It should be appreciated that firing the unitary core-shell mold 300 following the insertion of the support member(s) 310 may facilitate the securing of the support member(s) 310 within the reinforcement recess(es) 308.

In an embodiment, such as depicted in FIG. 4, the stress concentration(s) 404 may be a projected stress concentration(s) 404 resulting from the anticipated introduction of the component material 172 into the casting cavity 302. The stress concentration(s) 404 may be a point concentration and/or an area concentration, such as depicted in FIG. 4.

In an embodiment, the stress concentration(s) 404 may correspond to a potential mechanical stress concentration. Accordingly, the stress concentration(s) 404 may correspond to a projected creep of the location(s) 402. For example, at a given wall thickness (T) the shell and/or core wall 304, 306 may be projected to deform in response to load generated by the introduction of the component material 172. As such, the employment of the support member(s) 310 in accordance with the method 400 may preclude a necessity to increase the wall thickness (T) in order to resist creep (e.g., deformation).

In an additional embodiment, the stress concentration(s) 404 may correspond to a projected head pressure approaching a load limit 418 of the location(s) 402. In other words, it may be projected that the load exerted on the shell and/or core wall 304, 306 by the introduction of the component material 172 may exceed the load limit 418 of the location(s) 402. In such an embodiment, without reinforcement, or other support, the location(s) 402 may be breached resulting in a failure of the casting of the cast component. Therefore, the employment of the support member(s) 310 in accordance with the method 400 may preclude a necessity to increase the wall thickness (T) in order to increase the load limit 418 to a level capable of withstanding the projected head pressure.

In an embodiment the stress concentration(s) 404 may correspond to a potential thermal stress. For example, the stress concentration(s) 404 may be anticipated when the projected temperature of the component material 172 exceeds the thermal load limit of the location(s) 402. As a further example, the stress concentration(s) 404 may correspond to a coefficient of thermal expansion mismatch at the location(s) 402. Accordingly, it may be desirable to alter the thermal characteristics of the location(s) 402, and thus the shell and/or core wall 304, 306, via the positioning of the support member 310 adjacent to the location(s) 402.

As depicted at 420, the method 400 may include forecasting a stress magnitude (e.g., the magnitude of the stress concentration(s) 404) approaching the load limit 418 of the shell and/or core wall 304, 306 during a projected casting of the cast component. Based on the forecast stress magnitude approaching the load limit 418, the location(s) 402 susceptible to the stress concentration(s) 404 may be identified. It should be appreciated that the load limit 418 may be a mechanical load limit and/or a thermal load limit.

Figure 9:
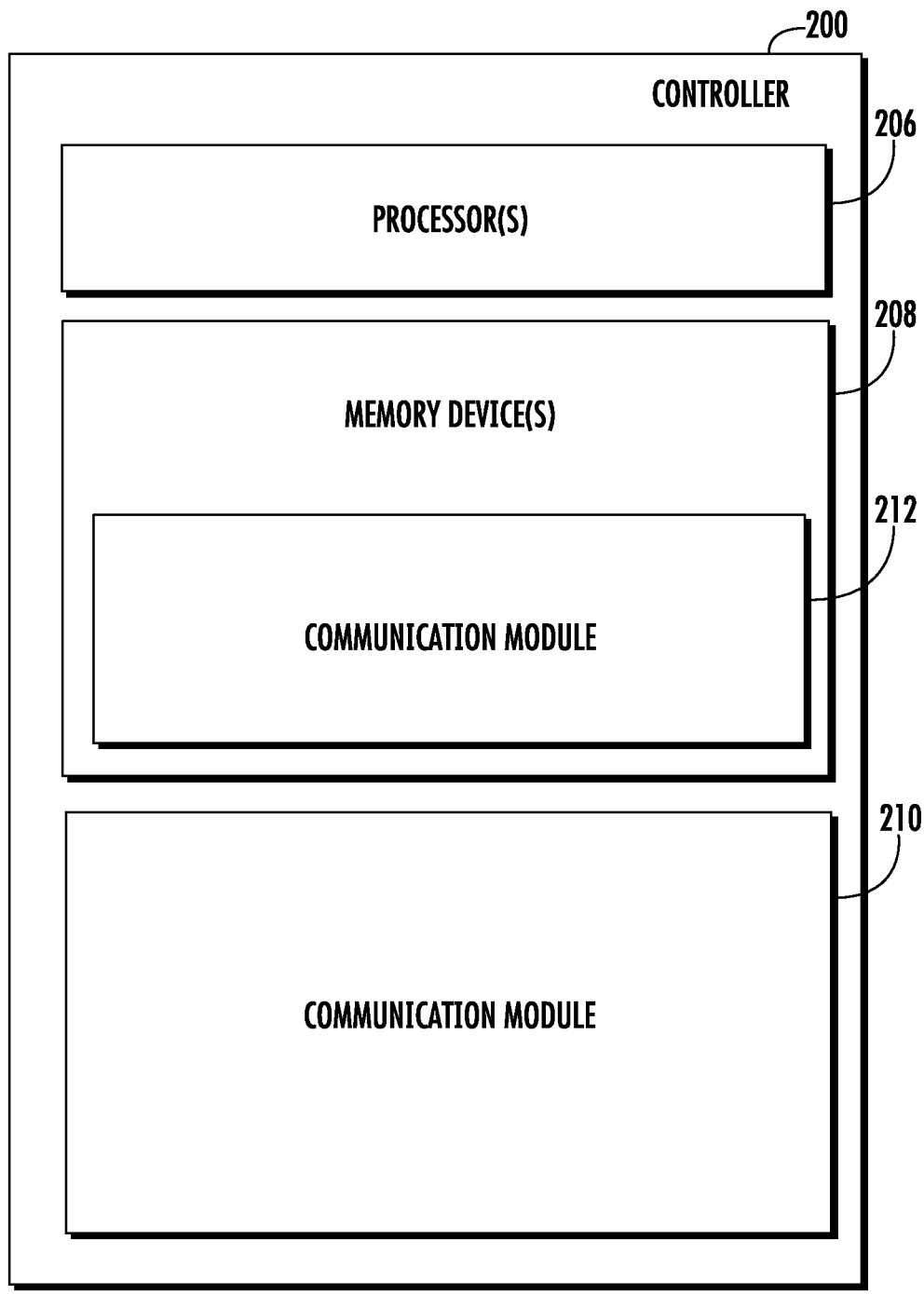
FIG. 9 illustrates a block diagram of one embodiment of a controller for use in accordance with the present disclosure.

In an embodiment, identifying the location(s) 402 may be accomplished via computer modeling. For example, as depicted in FIG. 9, a controller 200 may be employed to model the casting process at 422. Modeling the casting process at 422 may include modeling, via the controller 200, the introduction of the component material 172, in liquid form, into the casting cavity 302 during the casting of the cast component. Based on the modeled introduction of the component material 172, a predicted plurality of stresses 424 may be determined. The predicted plurality of stresses 424 may be such stresses as may be exerted by the component material 172 onto a corresponding plurality of portions 426 of the unitary core-shell mold 300.

In an embodiment, the plurality of stresses 424 may be utilized to determine a minimal wall thickness 428 for the unitary core-shell mold 300 (e.g., a minimal shell-wall thickness and a minimal core-wall thickness). The minimal wall thickness 428 may have a load limit 418 that is greater than at least one stress of the plurality of stresses 424 exerted by the component material 172. In an embodiment, the minimal wall thickness 428 for the shell and/or core wall 304, 306 may be determined as a percentage of a maximal projected stress. For example, the minimal wall thickness 428 may be established at a thickness wherein the resulting load limit 418 is sufficient to withstand 90% of the maximal projected stress of the plurality of stresses 424. In an alternative example, the minimal wall thickness 428 may be established at a thickness wherein the resulting load limit 418 is sufficient to withstand 50% of the maximal projected stress of the plurality of stresses 424. In yet a further example, the minimal wall thickness 428 may be determined based on the average projected stress of the plurality of stresses 424.

It should be appreciated that increasing the minimal wall thickness 428 may reduce the number of support members 310 that may be required but may increase the amount of added material and/or printing time required to produce the unitary core-shell mold 300. Similarly, it should be appreciated that reducing the minimal wall thickness 428 may result in material and/or production time savings, but may increase the number of support members 310 required to preclude failure of the unitary core-shell mold 300 during the casting process.

In an embodiment, the minimal wall thickness 428 determined via the modeling may determine the load limit 418 for the plurality of portions 426 of the unitary core-shell mold 300. As depicted at 430, the controller 200 may determine the stress concentration(s) 404 at which one of the plurality of stresses 424 approaches the load limit 418. Therefore, the location(s) 402 corresponding to the stress concentration(s) 404 may be a location(s) 402 susceptible to the stress concentration(s) 404.

In an embodiment, identifying the location(s) 402 susceptible to a stress concentration(s) 404 may be accomplished via an engineering diagnostic expert system 432. The engineering diagnostic expert system 432 may include manifestations of engineering domain knowledge, such as troubleshooting guides, anomaly validation reports, after-action reports, design specifications, testing reports, and/or other captures of the experience and decision-making knowledge of a human expert. For example, the engineering diagnostic expert system 432 may indicate that certain portions 426 of the unitary core-shell mold 300 may be more susceptible to creep than other portions 426. This indication may be based on previous experience with other, similar, casting processes.

In an embodiment, identifying the location(s) 402 may be accomplished via iterative testing. Accordingly, the method 400 may include iteratively testing a plurality of unitary core-shell mold prototypes 434 via a plurality of test castings. During the iterative testing cycle, the wall thickness (T) of the shell wall 304 and/or the core wall 306 may be reduced with each iterative test. By iteratively reducing the wall thickness (T), the iterative test cycle may identify the location(s) 402 of the unitary core-shell mold 300 that is susceptible to the stress concentration(s) 404 at a given wall thickness (T). For example, failure points of the unitary core-shell mold 300 may be noted during each iteration of the testing cycle. These locations 402 may be supported in a subsequent test iteration via the method 400 disclosed herein. This process may be repeated until a desirable balance between material and production time costs and the number of support members 310 is achieved.

As used herein, the terms "additively manufactured" or "additive manufacturing techniques or processes" refer generally to manufacturing processes wherein successive layers of material(s) are provided on each other to "build-up," layer-by-layer, a three-dimensional component (eg., mold). The successive layers generally fuse together to form a monolithic component that may have a variety of unitary sub-components. Although additive manufacturing technology is described herein for the fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present disclosure may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming unitary core-shell mold 300 using any suitable material. For example, the material may be plastic, metal, concrete, ceramic, polymer, epoxy, photopolymer resin, wax, or any other suitable material. These materials are examples of materials suitable for use in the additive manufacturing processes described herein and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows unitary core-shell mold 300 to be formed from multiple materials. Thus, the unitary core-shell mold 300 described herein may be formed from any suitable mixtures of the above materials. For example, the unitary core-shell mold 300 may include multiple layers, segments, or parts that are formed using different materials, processes, and/or on different additive manufacturing machines.

An exemplary additive manufacturing process will now be described. Additive manufacturing processes fabricate components using three-dimensional (3D) information, for example a three-dimensional computer model, of the unitary core-shell mold 300. Accordingly, a three-dimensional design model of the unitary core-shell mold 300 and/or the cast component may be defined prior to manufacturing. In this regard, a model or prototype of the unitary core-shell mold 300 and/or component may be scanned to determine the corresponding three-dimensional information. As another example, a model of the unitary core-shell mold 300 and/or the cast component may be constructed using a suitable computer aided design (CAD) program to define the three-dimensional design model of the unitary core-shell mold 300 and/or the cast component as described herein.

The design model may include 3D numeric coordinates of the entire configuration of the unitary core-shell mold 300 and/or the cast component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the unitary core-shell mold 300 and/or the cast component for a predetermined height of the slice. The plurality of successive cross-sectional slices together form the unitary core-shell mold 300. The unitary core-shell mold 300 is then "built-up" slice-by-slice, or layer-by-layer, until finished.

In this manner, the unitary core-shell mold 300 may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material or polymerize a liquid. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 µm and 200 µm, although the thickness may be selected based on any number of parameters and may be any suitable size according to alternative embodiments. Therefore, utilizing the additive formation methods described above, the unitary core-shell mold 300 described herein may have cross sections as thin as one thickness of an associated powder layer, e.g., 10 µm, utilized during the additive formation process.

In an embodiment, the additive manufacturing process employed to form the unitary core-shell mold 300 may, as depicted at 436, include contacting a pure portion of the unitary core-shell mold 300 with a liquid ceramic photopolymer. As shown at 438, the process may include irradiating a portion of the liquid ceramic photopolymer adjacent to the cured portion through a window contacting the liquid ceramic photopolymer. Additionally, as shown at 440, the unitary core-shell mold 300 may be removed from the uncured liquid ceramic photopolymer.

In addition, utilizing an additive process, the surface finish and features of the unitary core-shell mold 300 may vary as needed depending on the cast component. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the unitary core-shell mold 300 described herein were previously not possible due to manufacturing restraints. However, the present inventors have advantageously utilized current advances in, and limitations of, additive manufacturing techniques to develop exemplary embodiments of the unitary core-shell mold 300 in accordance with the present disclosure.

It should be appreciated that utilizing additive manufacturing methods, even multi-part components, such as a shell mold, a core, and/or a core mold may be formed as a single piece of additive ceramic or additive plastic, and may, thus, include fewer sub-components and/or joints compared to prior designs. The unitary formation of these multi-part components through additive manufacturing may advantageously improve the overall assembly process. For example, the unitary formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the cast component described herein. In addition, the additive manufacturing process enables the manufacture of a single component having different materials such that different portions of the component may exhibit different performance characteristics. The successive, additive nature of the manufacturing process enables the construction of these novel features. As a result, the components described herein may enable more intricate internal cast component shapes.

It should, however, be appreciated that employing additive manufacturing processes to manufacture a casting core and/or shell mold may result in difficulties associated with integrating the core/shell into an efficient manufacturing process. For example, the time required to form a casting core and/or a shell mold having sufficient dimensional stability (e.g., wall thickness) using an additive manufacturing process, such as a DLP process, may delay the manufacturing process and may require the use of excess material. Further, in the molding process, it may be desirable to efficiently produce portions of a core/mold that do not require the same dimensional accuracy as may be required other portions. For example, it may be desirable to produce passages for directing the flow of component material 172 into a single or plurality of molds. Further, when forming a core/mold via a DLP process, it may be desirable to improve the ease of removing the cast component from the mold once the casting is completed. For example, the knockout process may be improved by producing a thinner unitary core-shell mold 300 to reduce the likelihood that the cast product may be damaged upon removal of the unitary core-shell mold 300. It may also be desirable to control the thermal conductivity of the unitary core-shell mold 300 to control crystal growth and/or tailor the material properties of the cast component and/or manage thermal strains in the unitary core-shell mold 300. Accordingly, forming the unitary core-shell mold 300 via the methods disclosed herein may be particularly beneficial.

Referring again to FIG. 1, in general, the engine 100 may include a core gas turbine engine (indicated generally by reference character 114) and a fan section 116 positioned upstream thereof. The core engine 114 may generally include a substantially tubular outer casing 118 that defines an annular inlet 120. In addition, the outer casing 118 may further enclose and support a booster compressor 122 for increasing the pressure of the air that enters the core engine 114 to a first pressure level. A high pressure, multi stage, axial flow compressor 124 may then receive the pressurized air from the booster compressor 122 and further increase the pressure of such air. The pressurized air exiting the high pressure compressor 124 may then flow to a combustor 126 within which fuel is injected by a fuel system 164 into the flow of pressurized air, with the resulting mixture being combusted within the combustor 126. The high energy combustion products are directed from the combustor 126 along the hot gas path of the engine 100 to a first (high pressure, HP) turbine 128 for driving the high pressure compressor 124 via a first (high pressure, HP) drive shaft 130, and then to a second (low pressure, LP) turbine 132 for driving the booster compressor 122 and fan section 116 via a second (low pressure, LP) drive shaft 134 that is generally coaxial with first drive shaft 130. After driving each of turbines 128 and 132, the combustion products may be expelled from the core engine 114 via an exhaust nozzle 136 to provide propulsive jet thrust.

It should be appreciated that each turbine 128, 132 may generally include one or more turbine stages, with each stage including a turbine nozzle and a downstream turbine rotor. As will be described below, the turbine nozzle may include a plurality of vanes disposed in an annular array about the centerline axis 112 of the engine 100 for turning or otherwise directing the flow of combustion products through the turbine stage towards a corresponding annular array of rotor blades forming part of the turbine rotor. As is generally understood, the rotor blades may be coupled to a rotor disk of the turbine rotor, which is, in turn, rotationally coupled to the turbine's drive shaft (e.g., drive shaft 130 or 134).

Additionally, as shown in FIG. 1, the fan section 116 of the engine 100 may generally include a rotatable, axial-flow fan rotor 138 surrounded by an annular fan casing 140. In particular embodiments, the (LP) drive shaft 134 may be connected directly to the fan rotor 138 such as in a direct-drive configuration. In alternative configurations, the (LP) drive shaft 134 may be connected to the fan rotor 138 via a speed reduction device 137 such as a reduction gear gearbox in an indirect-drive or geared-drive configuration. Such speed reduction devices may be included between any suitable shafts/spools within engine 100 as desired or required.

It should be appreciated by those of ordinary skill in the art that the fan casing 140 may be supported relative to the core engine 114 by a plurality of substantially radially-extending, circumferentially-spaced outlet guide vanes 142. As such, the fan casing 140 may enclose the fan rotor 138 and its corresponding fan rotor blades 144. Moreover, a downstream section 146 of the fan casing 140 may extend over an outer portion of the core engine 114 to define a secondary, or by-pass, airflow conduit 148 that provides additional propulsive jet thrust.

During operation of the engine 100, it should be appreciated that an initial air flow 150 (indicated by arrow) may enter the engine 100 through an associated inlet 152 of the fan casing 140. The initial air flow 150 then passes through the fan blades 144 and splits into a first compressed air flow 154 (indicated by arrow) that moves through conduit 148 and a second compressed air flow 156 (indicated by arrow) that enters the booster compressor 122. The pressure of the second compressed air flow 156 is then increased and enters the high pressure compressor 124 (as indicated by arrow 158). After mixing with fuel and being combusted within the combustor 126, the combustion products 60 exit the combustor 126 and flow through the first turbine 128. Thereafter, the combustion products 60 flow through the second turbine 132 and exit the exhaust nozzle 136 to provide thrust for the engine 100.

Referring now to FIG. 9, wherein a block diagram of one embodiment of a controller 200 for use in accordance with the present disclosure is illustrated. As shown, the controller 200 may include one or more processor(s) 206 and associated memory device(s) 208 configured to perform a variety of computer-implemented functions (e.g., performing the methods, steps, calculations and the like and storing relevant data as disclosed herein). Additionally, the controller 200, may also include a communications module 210 to facilitate communications between the controller 200, and the various systems and/or operators. Further, the controller 200 may include a modeling module 212 configured to model a casting process utilizing the unitary core-shell mold 300 as described herein.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for casting a component, the method comprising: receiving data indicative of at least one location of a unitary core-shell mold which is susceptible to a stress concentration when the unitary core-shell mold is employed to cast the component; forming, via an additive manufacturing process, the unitary core-shell mold defining a casting cavity, the unitary core-shell mold comprising a shell wall defining an outer component shape and a core wall positioned inward of the shell wall and defining an inner component shape, wherein at least one of the shell wall and the core wall defines at least one reinforcement recess adjacent to the at least one location which is susceptible to the stress concentration; following the forming of the unitary core-shell mold, positioning at least one support member within the at least one reinforcement recess and in contact with the at least one location; and casting the cast component within the casting cavity.

Clause 2. The method of any preceding clause, wherein the stress concentration comprises a mechanical stress concentration.

Clause 3. The method of any preceding clause, wherein the mechanical stress concentration corresponds to at least one of a projected creep of the at least one location and a projected head pressure approaching a load limit of the at least one location.

Clause 4. The method of any preceding clause, wherein the stress concentration comprises a thermal stress concentration.

Clause 5. The method of any preceding clause, further comprising: identifying the at least one location of the unitary core-shell mold which is susceptible to the stress concentration by forecasting a stress magnitude approaching a load limit of at least one of the shell wall and the core wall during casting.

Clause 6. The method of any preceding clause, wherein identifying the at least one location further comprises: modeling, via a controller, an introduction of a component material in liquid form into the casting cavity during the casting of the cast component so as to determine a predicted plurality of stresses exerted by the component material onto a corresponding plurality of portions of the unitary core-shell mold; determining, via the controller, a minimal shell-wall thickness and a minimal core-wall thickness for the unitary core-shell mold, wherein the minimal shell-wall thickness and the minimal core-wall thickness have load limits which are greater than at least one of the plurality of stresses exerted by the component material; and determining, via the controller, the stress concentration comprising at least one of the plurality of stresses approaching the load limit of a corresponding portion of the plurality of portions of the unitary core-shell mold.

Clause 7. The method of any preceding clause, wherein identifying the at least one location comprises identifying the at least one location via an engineering diagnostic expert system.

Clause 8. The method of any preceding clause, wherein identifying the at least one location further comprises: iteratively testing a plurality of unitary core-shell mold prototypes via a plurality of test castings, wherein a thickness of at least one of the shell wall and the core wall is reduced with each iterative test in order to identify the at least one location of the unitary core-shell mold which is susceptible to the stress concentration at a given thickness of the shell wall or the core wall.

Clause 9. The method of any preceding clause, further comprising: firing the unitary core-shell mold prior to the positioning the at least one support member within the reinforcement recess.

Clause 10. The method of any preceding clause, further comprising: firing the unitary core-shell mold following the positioning of the at least one support member within the reinforcement recess.

Clause 11. The method of any preceding clause, wherein positioning the at least one support member within the reinforcement recess further comprises securing the at least one support member within the reinforcement recess.

Clause 12. The method of any preceding clause, wherein securing the support member within the reinforcement recess further comprises: engaging a first retention feature with a second retention feature.

Clause 13. The method of any preceding clause, wherein the support member comprises a refractory material having a melting temperature that is higher than the melting temperature of a component material.

Clause 14. The method of any preceding clause, wherein the shell wall comprises an outermost wall of the core-shell mold so that the core-shell mold has an absence of an overshell.

Clause 15. The method of any preceding clause, wherein the at least one reinforcement recess adjacent to the at least one location comprises at least a first and a second reinforcement recess adjacent to corresponding first and second locations susceptible to stress concentrations.

Clause 16. The method of any preceding clause, wherein the first reinforcement recess is defined by the shell wall and the second reinforcement recess is defined by the core wall.

Clause 17. A method for fabricating a unitary core-shell mold, the method comprising: receiving data indicative of at least one location of the unitary core-shell mold which is susceptible to a stress concentration when the unitary core-shell mold is employed to cast a component; forming the unitary core-shell mold to define a casting cavity, the unitary core-shell mold comprising a shell wall defining an outer component shape and a core wall positioned inward of the shell wall and defining an inner component shape, wherein at least one of the shell wall and the core wall defines at least one reinforcement recess adjacent to the at least one location which is susceptible to the stress concentration, wherein the forming of the unitary core-shell mold comprises: contacting a cured portion of the unitary core-shell mold with a liquid ceramic photopolymer, irradiating a portion of the liquid ceramic photopolymer adjacent to the cured portion through a window contacting the liquid ceramic photopolymer, and removing the unitary core-shell mold from the uncured liquid ceramic photopolymer; and following the forming of the unitary core-shell mold, positioning at least one support member within the at least one reinforcement recess and in contact with the at least one location.

Clause 18. The method of any preceding clause, wherein the stress concentration comprises at least one of a mechanical stress concentration and a thermal stress concentration, wherein the mechanical stress concentration corresponds to at least one of a projected creep of the at least one location and a projected head pressure approaching a load limit of the at least one location.

Clause 19. The method of any preceding clause, further comprising: identifying the at least one location of the unitary core-shell mold which is susceptible to the stress concentration by forecasting a stress magnitude approaching a load limit of at least one of the shell wall and the core wall during casting via at least one of an engineering diagnostic expert system, modeling, and iterative testing.

Clause 20. The method of any preceding clause, further comprising: firing the unitary core-shell mold following the positioning of the at least one support member within the reinforcement recess.

Clause 21. The method of any preceding clause, wherein the location that is susceptible to a stress concentration includes a plurality of locations of the unitary core-shell mold, wherein the mold is formed with a plurality of reinforcement recesses such that a reinforcement recess is defined in either the shell wall or the core wall adjacent to each of the plurality of locations, and a plurality of support members are positioned such that at least one support member is positioned within each reinforcement recess adjacent each location that is susceptible to a stress concentration.

What is claimed:
1. A method for casting a component, the method comprising:
   identifying a location of a unitary core-shell mold that is susceptible to a stress concentration by forecasting a stress magnitude approaching a load limit of a shell wall or a core wall during casting;
   receiving data indicative of the location of the unitary core-shell mold that is susceptible to the stress concentration when the unitary core-shell mold is employed to cast the component;
   forming, via an additive manufacturing process, the unitary core-shell mold defining a casting cavity, the unitary core-shell mold comprising the shell wall defining an outer component shape and the core wall positioned inward of the shell wall and defining an inner component shape, wherein the shell wall or the core wall defines a reinforcement recess adjacent to the location that is susceptible to the stress concentration;
   following the forming of the unitary core-shell mold, positioning a support member within the reinforcement recess and adjacent with the location and engaging the support member with a first retention feature in the reinforcement recess, wherein the first retention feature in the reinforcement recess is in a shape of the reinforcement recess creating a friction fit with the support member, is a protrusion or recess within the reinforcement recess shaped to engage a corresponding recess or protrusion of the support member, or includes an adhesive within the reinforcement recess; and
   casting the component within the casting cavity.

2. The method of claim 1, wherein the stress concentration comprises a mechanical stress concentration.

3. The method of claim 2, wherein the mechanical stress concentration corresponds to a projected creep of the location or a projected head pressure approaching a load limit of the location.

4. The method of claim 1, wherein the stress concentration comprises a thermal stress concentration.

5. The method of claim 1, wherein identifying the location further comprises:
   modeling, via a controller, an introduction of a component material in liquid form into the casting cavity during the casting of the component so as to determine a predicted plurality of stresses exerted by the component material onto a corresponding plurality of portions of the unitary core-shell mold;
   determining, via the controller, a minimal shell-wall thickness and a minimal core-wall thickness for the unitary core-shell mold, wherein the minimal shell-wall thickness and the minimal core-wall thickness have load limits that are greater than at least one of the plurality of stresses exerted by the component material; and
   determining, via the controller, the stress concentration comprising at least one of the plurality of stresses approaching the load limit of a corresponding portion of the plurality of portions of the unitary core-shell mold.

6. The method of claim 1, wherein identifying the location comprises identifying the location via an engineering diagnostic expert system.

7. The method of claim 1, wherein identifying the location further comprises:
   iteratively testing a plurality of unitary core-shell mold prototypes via a plurality of test castings, wherein a thickness of the shell wall or the core wall is reduced with each iterative test to identify the location of the unitary core-shell mold that is susceptible to the stress concentration at a given thickness of the shell wall or the core wall.

8. The method of claim 1, further comprising:
firing the unitary core-shell mold prior to the positioning of the support member within the reinforcement recess.

9. The method of claim 1, further comprising:
firing the unitary core-shell mold following the positioning of the support member within the reinforcement recess.

10. The method of claim 1, further comprising:
engaging the first retention feature in the reinforcement recess with a second retention feature in the support member.

11. The method of claim 1, wherein the support member comprises a refractory material having a melting temperature that is higher than the melting temperature of a component material.

12. The method of claim 1, wherein the shell wall comprises an outermost wall of the unitary core-shell mold so that the unitary core-shell mold has an absence of an overshell.

13. The method of claim 1, wherein the reinforcement recess adjacent to the location comprises at least a first and a second reinforcement recess adjacent to corresponding first and second locations susceptible to stress concentrations.

14. The method of claim 13, wherein the first reinforcement recess is defined by the shell wall and the second reinforcement recess is defined by the core wall.

* * * * *